UNITED STATES PATENT OFFICE 2,090,068

2,4-DIOXO-3,3-DIALKYL-TETRAHYDRO-PYRIDINES AND PROCESS FOR THE MANUFACTURE OF SAME

Ernst Preiswerk, Münchenstein, near Basel, and Otto Schnider, Basel, Switzerland, assignors to Hoffmann-La Roche Inc., Nutley, N. J., a corporation of New Jersey No Drawing. Application June 1, 1936, Serial No. 82,992. In Germany June 17, 1935

8 Claims. (Cl. 260—42)

Ketones react with formic esters to form hydroxy-methylene-ketones. Dialkyl-aceto-acetic-esters react in a similar manner (Berichte der Deutschen Chemischen Gesellschaft vol. 59, 1926, page 110).

It has now been found, that a new class of compounds, designated as 2,4-dioxo-3,3-dialkyl-tetra-hydro-pyridines, is obtained by heating hydroxy-methylene-dialkyl-aceto-acetic esters with ammonia to a higher temperature. The conversion is performed in two phases.

At first the amino-methylene compound is produced according to the equation

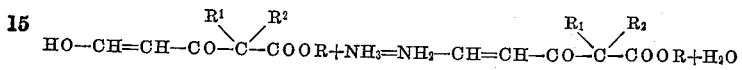

The amino-methylene compounds of the dialkyl-aceto-acetic esters are stable. They may be purified by distillation under reduced pressure.

Whereas the formation of the amino-methylene compounds of the dialkyl-aceto-acetic esters takes place rapidly even at room temperature or only slightly above, ring-closure in the absence of other condensing agents than ammonia only sets in at about 100° C. or above. It could not be foreseen that the carboxy group of the dialkyl-aceto-acetic ester compound would condense with the amino group, because it is a known fact that for instance diethyl-aceto-acetic ester does not react with ammonia (Annalen der Chemie vol. 231, 1885, page 244). The transformation of the amino-methylene-dialkyl-aceto-acetic esters into the corresponding pyridine takes place with particular ease if a stronger condensing agent than ammonia, for instance sodium-alcoholate or the like, is used; alkalis, such as potassium hydroxide, may also be used to advantage. This internal condensation may be illustrated by the following formula:

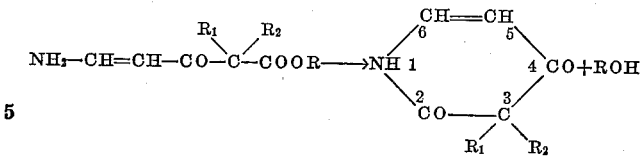

R, R₁ and R₂ represent alkyl groups, R represents principally ethyl or methyl; R₁ and R₂ likewise represent alkyl groups which may be the same or different, saturated or unsaturated.

The 2,4-dioxo-3,3-dialkyl-tetra-hydro-pyridines are readily soluble in organic solvents. They dissolve in cold dilute alkali hydroxide forming a slightly yellow solution. They may be precipitated unchanged from the alkaline solution with acid or even with carbon dioxide. By the action of methylating agents, compounds methylated on the nitrogen atom may be obtained. Hydrogenation yields the corresponding piperidine derivatives. The 2,4-dioxo-3,3-diethyl-tetra-hydro-pyridine forms well crystalline stable compounds with 1-phenyl-2,3-dimethyl-4-isopropyl-pyrazolone and with 1-phenyl-2,3-dimethyl-4-dimethyl-amino-pyrazolone.

The new compounds are to be used as medicines, as they exert a strong soporific action.

Example 1

1100 parts by weight of anhydrous toluene are poured over 23 parts by weight of finely ground sodium. A mixture of 100 parts by weight of methyl formate and 186 parts by weight of diethyl-aceto-acetic ester is dropped in at 20–30° C. while stirring. After some time the sodium salt of the hydroxy-methylene compound begins to be precipitated. When all the sodium has reacted the product is poured into ice and after it has settled the aqueous layer is separated from the toluene. By acidifying the aqueous solution the hydroxy-methylene-diethyl-aceto-acetic ester is precipitated as an oil. It may be purified by distillation in vacuo.

214 parts by weight of hydroxy-methylene-diethyl-aceto-acetic ester are dissolved in 400 parts by weight of 5% aqueous ammonia. The reaction product is warmed slightly and the precipitated oil is collected. The amino-methylene-dialkyl-aceto-acetic ester thus obtained may be purified by distillation under reduced pressure.

It forms a viscous oil boiling at 179–182° C./14 mm.

To an alcoholic sodium-ethylate solution, prepared with 23 parts by weight of sodium and 260 parts by weight of absolute alcohol, 213 parts by weight of amino-methylene-diethyl-aceto-acetic ester are added and the product is heated for 30 minutes under a reflux condenser, whereby it is kept gently boiling. It is then left to cool and the alcohol is distilled off in vacuo as completely as possible. The solid residue is dissolved in ice water and neutralized with dilute hydrochloric acid. The precipitated solid crude product is separated from the liquid by filtration and purified by distillation in vacuo (B. Pt. 187–189° C./14 mm.) and by crystallization from benzene with an addition of petroleum ether.

The 2,4-dioxo-3,3-diethyl-tetra-hydro-pyridine forms colourless crystals melting at 98–99° C., which are easily soluble in warm water, slightly soluble in cold water. The compound is very easily soluble in the usual organic solvents except in petroleum ether. By catalytic hydrogenation the corresponding piperidine derivative is obtained. With pyrazolone derivatives well crystalline stable compounds in molecular proportions are formed, for instance with 1-phenyl-2,3-dimethyl-4-dimethylamino-pyrazolone (M. P.=69–70° C.) or with 1-phenyl-2,3-dimethyl-4-isopropyl-pyrazolone (M. P.=93° C.).

Example 2

238 parts by weight of hydroxy-methylene-diallyl-aceto-acetic ester (obtained from diallyl-aceto-acetic ester and formic ester) are dissolved in 500 parts by weight of methanol; 70 parts by weight of dried ammonia are passed in while cooling with ice. The solution is then heated in a closed receptacle for 6 hours to 150° C. After cooling the solvent and the excess of ammonia are removed by distillation. The remaining reaction-product may be purified in the manner described in Example 1 for the diethyl compound.

The 2,4-dioxo-3,3-diallyl-tetra-hydro-pyridine thus obtained melts at 81–82° C. and boils under 14 mm. pressure at 208–210° C. without decomposition.

Example 3

242 parts by weight of hydroxy-methylene dipropyl-aceto-acetic ester (B. Pt. 135–137° C./14 mm.) are dissolved in 250 parts by weight of absolute alcohol; 20 parts by weight of ammonia gas are passed into the solution while cooling. After warming to gentle ebullition 280 parts by weight of an alcoholic sodium-ethylate solution corresponding to 23 parts by weight of sodium are added and to ensure a complete conversion the product is further heated for half an hour under a reflux condenser to boiling point. The solvent is then completely removed by distillation under reduced pressure. When cold the residue is dissolved in 500 parts by weight of ice-cold water and the reaction product precipitated by acidifying with dilute hydrochloric acid. For complete purification the residue may after drying be recrystallized from petroleum ether.

The 2,4-dioxo-3,3-dipropyl-tetra-hydro-pyridine forms colourless needles melting at 92–93° C. By methylating it is transformed into 1-methyl-2,4-dioxo-3,3-di-n-propyl-tetra-hydro-pyridine melting at 61–62° C.

Example 4

186 parts by weight of diethyl-aceto-acetic ester are condensed with formic ester in the manner described in Example 1. To the aqueous solution of the sodium salt of the hydroxy-methylene compound, separated from the toluene, 70 parts by weight of ammonium chloride are added and the product heated for an hour to 80–85° C. The precipitated amino-methylene-diethyl-aceto-acetic ester is diluted with ether, separated from the aqueous solution and the solvent removed by distillation. Then the residue is dissolved in 250 parts by weight of alcohol and 120 parts by weight of 50% aqueous potassium hydroxide solution are added to the solution, the temperature of the solution being kept at 50° C. for a quarter of an hour. To obtain the reaction-product the alcohol is removed by distillation under reduced pressure, the residue dissolved in cold water and acidified with dilute sulphuric acid. The product is identical with the product of Example 1.

Example 5

256 parts by weight of hydroxy-methylene-n-butyl-n-propyl-aceto-acetic ester (B. Pt. 151–154° C./14 mm.) are dissolved in 256 parts by weight of absolute alcohol and 20 parts by weight of ammonia are passed in while cooling. The product is heated until it begins to boil, 256 parts by weight of alcoholic sodium-ethylate solution corresponding to 23 parts by weight of sodium are added and the alcohol is removed by distillation. When cold the residue is dissolved in 600 parts by weight of cold water and carbon dioxide passed in until the precipitation is completed. If before the treatment with carbon dioxide the alkaline solution has been filtered, the precipitated product will be almost pure. By recrystallization from petroleum ether the 2,4-dioxo-3,3-n-butyl-n-propyl-tetra-hydro-pyridine is obtained in colourless crystals melting at 101–102° C.

Example 6

242 parts by weight of hydroxy-methylene-n-butyl-ethyl-aceto-acetic ester are dissolved in 400 parts by weight of absolute alcohol. After having passed in 20 parts by weight of ammonia gas, the solution is heated for half an hour to 50–60° C. Then a solution of sodium ethylate, prepared from 23 parts by weight of sodium and 260 parts by weight of absolute alcohol, is added and the reaction-product boiled for a short time under a reflux condenser. The product is worked up in the manner described in Example 3. The 2,4-dioxo-3,3-n-butyl-ethyl-tetra-hydro-pyridine melts at 86° C.

Example 7

20 parts by weight of ammonia gas are passed into an ice-cooled solution of 242 parts by weight of hydroxy-methylene-isopropyl-n-propyl-aceto-acetic ester (prepared with sodium from isopropyl-n-propyl-aceto-acetic ester and formic ester in toluene; B. Pt. 129–133° C./14 mm.) in 320 parts by weight of methanol. The solution is heated until it begins to boil. Then a solution of 60 parts by weight of potassium hydroxide in 240 parts by weight of methanol is added and the product heated for 30 minutes under a reflux condenser until it begins to boil. After evaporating the solvent the potassium salt obtained is dissolved in cold water and the 2,4-dioxo-3,3-isopropyl-n-propyl-tetra-hydro-pyridine is precipitated from the solution with acids. When recrystallized from dilute alcohol, the compound melts at 131–132° C.

Example 8

326 parts by weight of hydroxy-methylene-di-n-propyl-aceto-acetic ester (obtained in the usual manner from the substituted aceto-acetic ester and formic ester) are dissolved in 400 parts by weight of absolute alcohol and treated with ammonia and sodium-ethylate in the manner described in Example 6. The pure compound thus obtained melts at 125° C.

We claim:

1. The 2,4-dioxo-3,3-dialkyl-tetra-hydro-pyridines of the type formula:

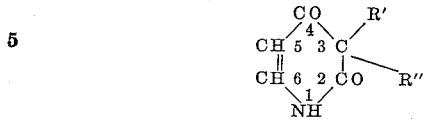

being unsubstituted in the 5 and 6 positions, and in which R' and R'' are alkyl groups.

2. The 2,4-dioxo-3,3-diethyl-tetra-hydro-pyridine, forming colourless crystals melting at 98-99° C., being easily soluble in warm water, slightly soluble in cold water, very easily soluble in the usual organic solvents except petroleum ether, forming well crystalline stable compounds with pyrazolone derivatives.

3. The amino-methylene-dialkyl-aceto-acetic esters.

4. The amino-methylene-diethyl-aceto-acetic ester.

5. The process for the manufacture of 2,4-dioxo - 3,3 - dialkyl - tetra-hydro-pyridines, which consists in treating amino-methylene-dialkyl-aceto-acetic esters, obtained by the action of ammonia on hydroxy - methylene - dialkyl - aceto-acetic esters, with alkaline condensing agents.

6. The process for the manufacture of 2,4-dioxo - 3,3 - dialkyl-tetra-hydro-pyridines, which consists in treating amino-methylene-dialkyl-aceto-acetic esters, obtained by the action of ammonia on hydroxy - methylene - dialkyl - aceto-acetic esters, with alkaline condensing agents in alcoholic solution.

7. The process for the manufacture of 2,4-dioxo-3,3-diethyl-tetra - hydro - pyridine, which consists in treating amino-methylene-diethyl-aceto-acetic ester, obtained by the action of ammonia on hydroxy - methylene - diethyl - aceto-acetic ester, with alkaline condensing agents.

8. The process for the manufacture of 2,4-dioxo - 3,3 - diethyl-tetra-hydro-pyridine, which consists in treating amino-methylene-diethyl-aceto-acetic ester, obtained by the action of ammonia on hydroxy - methylene - diethyl-aceto-acetic ester, with alkaline condensing agents in alcoholic solution.

ERNST PREISWERK.
OTTO SCHNIDER.